United States Patent [19]
Caldwell, Jr. et al.

[11] 3,885,515
[45] May 27, 1975

[54] RIGID LINE ARRAY SUSPENSION SYSTEM

[75] Inventors: Hamlin A. Caldwell, Jr., Stonington, Conn.; Ralph R. Miller, III, Seattle, Wash.

[73] Assignee: The United States of America as represented by the Secretary of the Navy, Washington, D.C.

[22] Filed: June 7, 1974

[21] Appl. No.: 477,528

[52] U.S. Cl............................. 114/235 B; 340/3 T
[51] Int. Cl............................................. B63b 21/56
[58] Field of Search ..... 114/235 B, 235 R; 340/3 T, 340/7 R, 7 PC, 6 R

[56] References Cited
UNITED STATES PATENTS
2,607,842 8/1952 Reid ................................ 114/235 B
3,354,984 11/1967 Pavey ................................... 340/7 R
3,374,852 3/1968 Strange et al. ...................... 340/7 R Primary Examiner—Trygve M. Blix
Assistant Examiner—Gregory W. O'Connor
Attorney, Agent, or Firm—Richard S. Sciascia; Arthur A. McGill; Prithvi C. Lall

[57] ABSTRACT

A towed negatively buoyant rigid linear array has three forward floats of double ogival shape with a buoyancy equal to or slightly greater than the negative buoyancy of the array attached to a tow cable. The distance between the array and the middle float is equal to the desired array depth. The separation between the centers of the floats is equal to $2\pi$ times the minimum bend radius. A drogue line at the aft end of the array is adjusted to equal the depth at which the array is to be suspended.

5 Claims, 3 Drawing Figures

PATENTED MAY 27 1975 3,885,515

RIGID LINE ARRAY SUSPENSION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to an arrangement for towing negatively buoyant body and mor particularly to a system for automatically suspending a towed negatively buoyant rigid body at a predetermined depth when the towing vessel and system are at zero speed in water.

A known towed passive sonar system includes a rigid linear passive sonar array, 26 feet long and 3 inches in diameter, towed from a vessel by a cable 1,500 feet long. The array has about twenty pounds of negative buoyancy and the tow cable is neutrally buoyant. For acoustic reasons it is desirable to tow the array horizontally at a depth between ten and fifty feet. Array depth is determined by towing speed and the number and spacing of detachable weights attached to the forward end of the tow cable.

Noise from the towing vessel and flow noise significantly degrade the acoustic effectiveness of the array when it is towed. In some tactical situations it is desirable to alternate high speed towing with quiet listening periods with the array dead in the water and the towing vessel silent. In addition to this sprint and drift tactic, it is at times advantageous to employ the array with the towing vessel at anchor. Neither method of operation is possible in the abovementioned system. The negatively buoyant array sinks at zero speed and is suspended vertically from its buoyant drogue. To determine target bearing the array must be horizontal to the water's surface.

It is possible to suspend the array horizontally from the bottom in shallow water using two anchoring clumps and two peanut buoys or to suspend it from the surface using two peanut buoys. The disadvantage of both of these methods is that the array must be reeled in, re-rigged, and re-streamed whenever the transitions between the towed and suspended modes of operation are made. This is time consuming and difficult and perhaps dangerous or impossible in heavy weather.

SUMMARY OF THE INVENTION

Accordingly, it is a general purpose and object of the present invention to provide an improved rigid line array suspension system. It is a further object to provide a configuration adapted to automatically suspend a towed negatively buoyant rigid linear body horizontally to the water's surface at a pre-determined depth when the towing vessel stops its engines and becomes dead in the water without handling the body or its tow cable from the vessel.

Another object is to enable a towing vessel to get underway and tow the aforementioned horizontally suspended body at a predetermined depth without handling the body or its tow cable from the vessel. Other objects include low cost, faired surface and ease of manufacture.

The above objects are obtained by providing a towing system having a rigid linear array with weights at forward end and a buoyant member at the aft end with a plurality of buoyant members of predetermined spacing and shape disposed intermediate the array and weights. This enables the array to remain horizontal in water at all times whether the array is in motion or stopped. It also tends to give the array a horizontal position during periods of acceleration and deceleration.

DESCRIPTION OF THE PREFERRED EMBODIMENT

Figure 1:
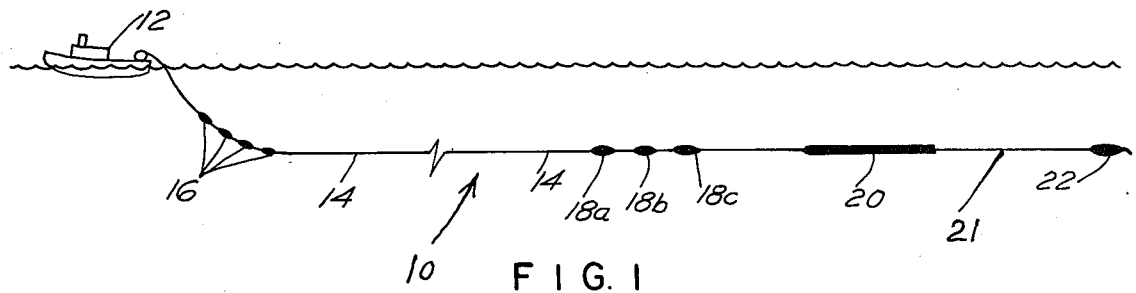
FIG. 1 is a view of a configuration of a towed linear array in accordance with the present invention.

Referring now to FIG. 1, there is shown the configuration of a towed system 10 in motion beneath the surface of the water. A vessel 12 utilized as the towing device with a tow cable 14 connecting directly several components in the system 10 to the vessel 12.

A plurality of weights 16 that are normally faired for suitable motion through the water are connected near the forward end of tow cable 14. Three floats 18a, 18b and 18c are connected to cable 14 aft of weights 16. Next in sequence is the linear array 20 which is normally a passive device. utilized for listening to noises in the vicinity. At the aft end of array 20 is a drogue line 21 with an associated drogue 22.

In the present arrangement the cable 14 has a length of approximately 1,500 feet and is of neutral buoyancy. The array 20 is approximately 26 feet. The distances from a point intermediate the floats 18a and 18c to the forward end of array 20, and the length of the drogue line, are both 27 feet. The significance that the preceding distances must be approximately equal will be described in conjunction with the explanation of FIG. 3.

Figure 2:
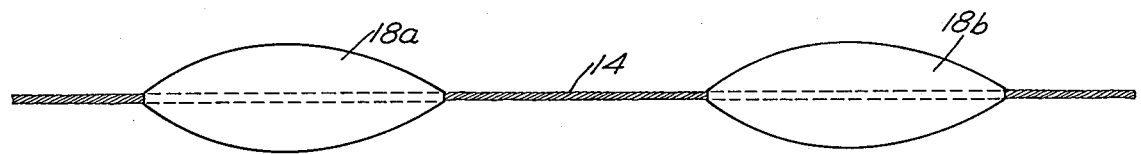
FIG. 2 is an enlarged view of a pair of the floats shown in FIG. 1.

Referring now to FIG. 2, there is shown floats 18a and 18b with the connecting portion of cable 14. The floats 18a and 18b shown, as well as float 18c, are identical, of double ogival form and are made of syntactic foam. The separations between the centers of the floats 18a and 18b, and in addition from float 18b to 18c, are equal to $2\pi$ times the minimum bend radius of the cable 14.

Figure 3:
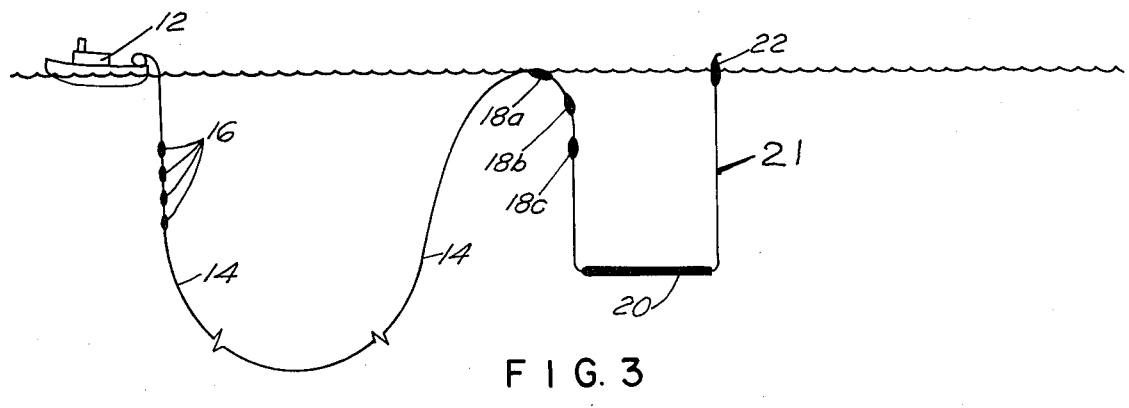
FIG. 3 is a view of the configuration of FIG. 1 at zero speed.

FIG. 3 shows the configuration at zero speed. The array 20 is suspended horizontally at the depth of the drogue line 21. The float 18a is shown at the surface of the water. The remaining cable 20 aft of float 18a, taking curvature into consideration, extends to the same depth as does drogue line 21. This permits array 20 to be arranged in the horizontal position for maximum effectiveness. It is essential that the floats 18a, 18b and 18c in conjunction with drogue 22 have sufficient buoyancy so that drogue 22 and a portion of the system between 18a and 18c are maintained at the surface of the water. The system has been found to be most effective when float 18a is the surface float. This permits the distance from float 18b to the fore end of array 20 to be approximately equal to the length of the drogue line 21.

There has therefore been shown a towed linear array system wherein a rigid linear passive sonar array is automatically suspended in a horizontal position whether in motion or at zero speed. The system requires no ad-

What is claimed is:

1. An array suspension system suitable for towing in water comprising:
   a tow cable;
   weighting means connected near the fore end of said tow cable for adding negative buoyancy to the system;
   first buoyant means adapted for being towed totally submerged underwater and further adapted for rising to the surface of the water at zero speed connected to said tow cable aft of said weighting means;
   an array of negative buoyancy having forward and aft ends, said forward end connected to said tow cable a predetermined distance from said floating means to enable said forward end of said array of negative buoyancy to be suspended at a predetermined depth in water when the system is at zero speed;
   a drogue system including a drogue line with a second buoyant means connected to the aft end of said drogue line, said second buoyant means adapted for being towed totally submerged underwater and further adapted for rising to the surface of the water at zero speed, said second buoyant means comprising a drogue, said drogue line having its forward end connected to said aft end of said array and said drogue line being a predetermined length to enable said array of negative buoyancy to be suspended at said predetermined depth when the array suspension system is at zero speed.

2. An array suspension system according to claim 1 wherein the positive buoyancy of the combination of said first buoyant means and said second buoyant means are at least equal to the negative buoyancy of said array of negative buoyancy.

3. An array suspension system according to claim 2 wherein said first buoyant means further comprises a first, second and third float connected to said tow cable and separated from each other a distance equal to $2\pi$ times the minimum bend radius of said cable, the distance from a point intermediate the first and third floats to said forward end of said array of negative buoyancy being equal to the length of said drogue line.

4. An array suspension system according to claim 3 wherein said first, second and third floats further comprise three identical floats of double ogival shape made of syntactic foam.

5. An array suspension system according to claim 4 wherein said array of negative buoyancy comprises a sonar passive rigid line array.

* * * * *